United States Patent
Kurita

(10) Patent No.: US 8,863,188 B2
(45) Date of Patent: Oct. 14, 2014

(54) ELECTRONIC APPARATUS AND CHANNEL SELECTION METHOD

(71) Applicant: Kabushiki Kaisha Toshiba, Tokyo (JP)

(72) Inventor: Yukihiro Kurita, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/709,782

(22) Filed: Dec. 10, 2012

(65) Prior Publication Data

US 2013/0283315 A1 Oct. 24, 2013

(30) Foreign Application Priority Data

Apr. 20, 2012 (JP) ................................ 2012-096792

(51) Int. Cl.
- G06F 3/00 (2006.01)
- G06F 13/00 (2006.01)
- H04N 5/445 (2011.01)
- H04N 21/482 (2011.01)
- H04N 21/431 (2011.01)

(52) U.S. Cl.
CPC ......... *H04N 21/482* (2013.01); *H04N 21/4823* (2013.01); *H04N 21/4312* (2013.01); *H04N 21/4314* (2013.01); *H04N 21/4821* (2013.01)
USPC .................... 725/43; 725/37; 725/38; 725/39; 725/40; 725/52

(58) Field of Classification Search
CPC ............ H04N 21/431; H04N 21/4312; H04N 21/4314; H04N 21/482; H04N 21/4821; H04N 21/4823
USPC ...................................................... 725/37–61
See application file for complete search history.

(56) References Cited

U.S. PATENT DOCUMENTS

| 7,577,973 | B1* | 8/2009 | Kapner et al. ................... 725/44 |
| 8,347,332 | B2 | 1/2013 | Fukuda et al. |
| 2003/0154484 | A1* | 8/2003 | Plourde et al. .................. 725/58 |
| 2004/0088727 | A1* | 5/2004 | Kamiya .......................... 725/52 |

(Continued)

FOREIGN PATENT DOCUMENTS

| EP | 1 317 141 | 6/2003 |
| JP | 2006-295514 | 10/2006 |

(Continued)

OTHER PUBLICATIONS

Information Sheet in one page (received from client on Dec. 4, 2012).
Extended European Search Report dated Jul. 24, 2013 in corresponding European Application No. 12195439.
Office Action, mailed Apr. 9, 2013, in corresponding application No. JP 2012-096792.

*Primary Examiner* — Jeremy Duffield
(74) *Attorney, Agent, or Firm* — Knobbe, Martens, Olson & Bear LLP

(57) ABSTRACT

According to one embodiment, a apparatus includes a tuner configured to receive a broadcasting wave that is broadcasted from a broadcasting station, an receiver configured to receive program information corresponding to programs, a display controller configured to display an electronic program guide includes program sections corresponding to programs based on the program information, a selection module configured to display a first window includes a first operation area, when it is detected that a first program section is operated, and the first program which corresponds to the first program section is not broadcasted, and a request module configured to request the tuner to select the first broadcasting station when the first operation area is operated.

7 Claims, 10 Drawing Sheets

(56) References Cited

U.S. PATENT DOCUMENTS

| | | |
|---|---|---|
| 2006/0239640 A1 | 10/2006 | Watanabe et al. |
| 2007/0118854 A1* | 5/2007 | Moon ............................ 725/50 |
| 2007/0124786 A1 | 5/2007 | Kim et al. |
| 2007/0162937 A1* | 7/2007 | Casement et al. .............. 725/58 |
| 2007/0226376 A1 | 9/2007 | Konno et al. |
| 2010/0180303 A1 | 7/2010 | Kudo |
| 2010/0186036 A1* | 7/2010 | Suh et al. ........................ 725/40 |
| 2010/0229198 A1* | 9/2010 | Lee et al. ........................ 725/43 |
| 2011/0106842 A1 | 5/2011 | Nishizawa |
| 2012/0062471 A1 | 3/2012 | Poulidis |
| 2012/0092355 A1* | 4/2012 | Yamamoto et al. ........... 345/522 |

FOREIGN PATENT DOCUMENTS

| | | |
|---|---|---|
| JP | 2007-181192 | 7/2007 |
| JP | 2007-208961 | 8/2007 |
| JP | 2007-208961 A | 8/2007 |
| JP | 2007-235847 | 9/2007 |
| JP | 2010-226149 A | 10/2010 |
| JP | 2010-245904 A | 10/2010 |

\* cited by examiner

FIG. 3

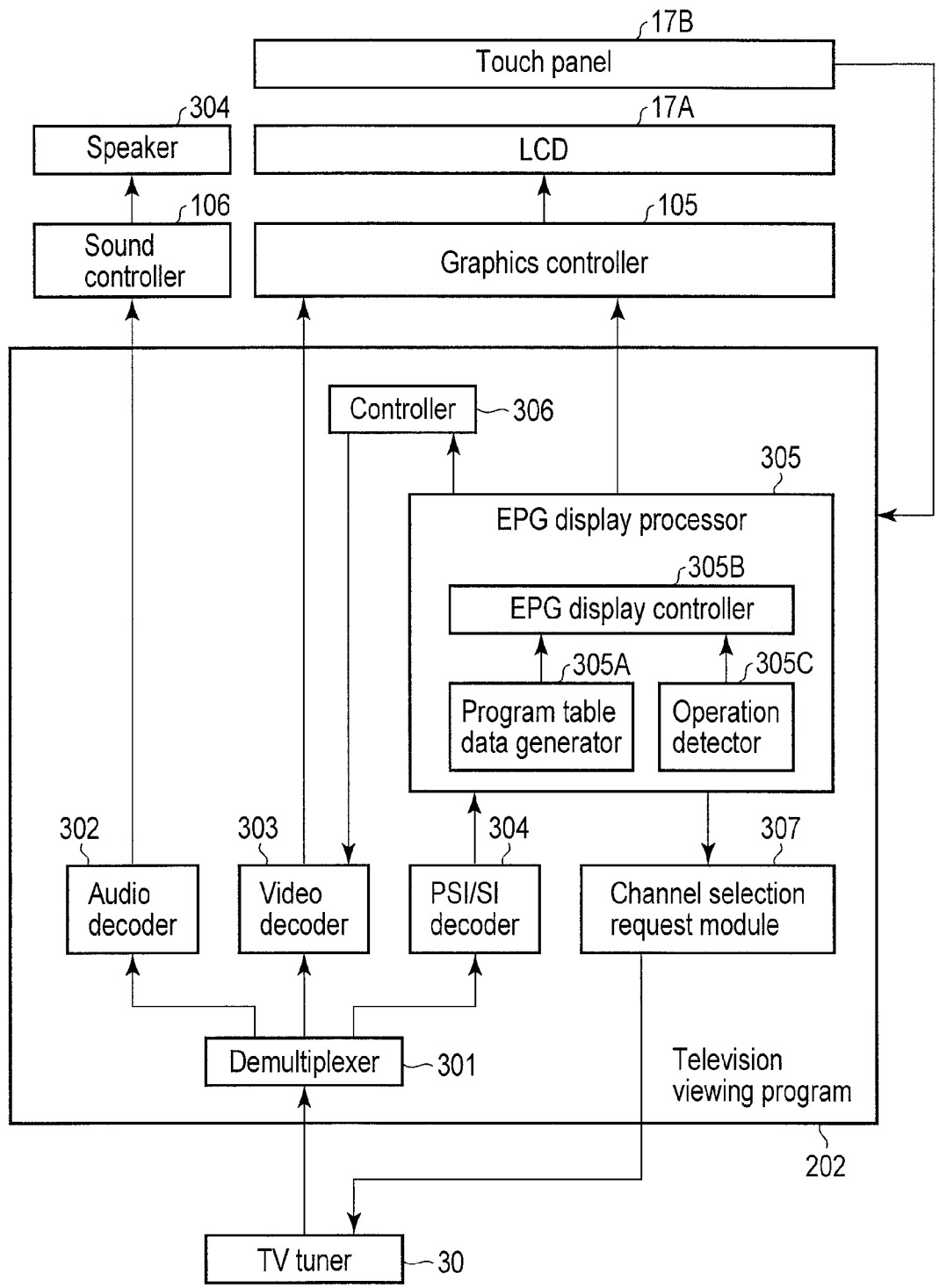
F I G. 4

FIG. 6

ELECTRONIC APPARATUS AND CHANNEL SELECTION METHOD

CROSS-REFERENCE TO RELATED APPLICATIONS

This application is based upon and claims the benefit of priority from Japanese Patent Application No. 2012-096792, filed Apr. 20, 2012, the entire contents of which are incorporated herein by reference.

FIELD

Embodiments described herein relate generally to an electronic apparatus and a channel selection method, which display an electronic program guide.

BACKGROUND

At present, electronic program guides (EPG) are widely used to perform programmed recording and programmed viewing of television programs.

There are demands for performing easy channel selection from a state in which an electronic program guide is displayed.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary diagram illustrating an example of an electronic program guide which is displayed on an LCD based on EPG display data that is generated by a television viewing program.

FIG. 4 is an exemplary block diagram illustrating an example of a structure of the television viewing program according to the embodiment.

FIG. 6 is an exemplary diagram illustrating an example of the electronic program guide.

DETAILED DESCRIPTION

Various embodiments will be described hereinafter with reference to the accompanying drawings.

In general, according to one embodiment, an electronic apparatus comprises a tuner, a receiver, a display controller, a selection module, and a request module. The tuner is configured to receive a broadcasting wave from a broadcasting station, the broadcasting station selected from a plurality of broadcasting stations. The receiver is configured to receive program information corresponding to programs that are broadcast by the plurality of broadcasting stations. A display controller is configured to display, on a display screen, an electronic program guide comprising program sections, the program sections corresponding to programs broadcast during a first time period, the electronic program guide based on the program information. The selection module is configured to display, if a first program section corresponding a first program is operated and the first program was not being broadcasted. The first window comprises a first operation area configured to allow a user to determine whether to select a first broadcasting station. The first broadcasting station is configured to broadcast the first program. The request module is configured to request the tuner select the first broadcasting station if the first operation area is operated.

First, a structure of an electronic apparatus according to the present embodiment will be explained hereinafter with reference to FIG. 1. The electronic apparatus can be realized as a portable terminal, such as a tablet personal computer, a laptop or notebook personal computer, and a PDA. In the following explanation, suppose that the electronic apparatus is realized as tablet personal computer 10 (hereinafter referred to as "computer 10").

Figure 1:
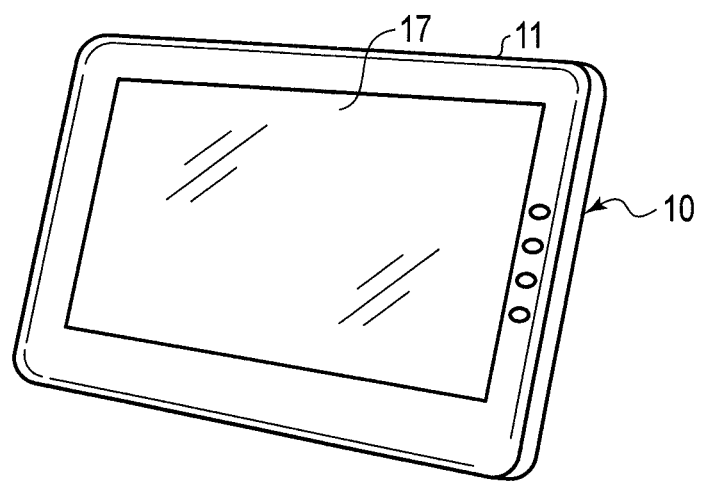
FIG. 1 is an exemplary diagram illustrating an external appearance of an electronic apparatus according to an embodiment.

FIG. 1 is a diagram illustrating an external appearance of the computer 10. The computer 10 comprises a computer main body 11 and a touch screen display 17. The computer main body 11 includes a housing having a thin box shape. The touch screen display 17 is disposed on a surface of the computer main body 1. The touch screen display 17 includes a flat panel display (such as a liquid crystal display (LCD)) and a touch panel. The touch panel is provided to cover a screen of the LCD. The touch panel is configured to detect a position on the touch screen display 17 which is touched by a user's finger or a pen.

Figure 2:
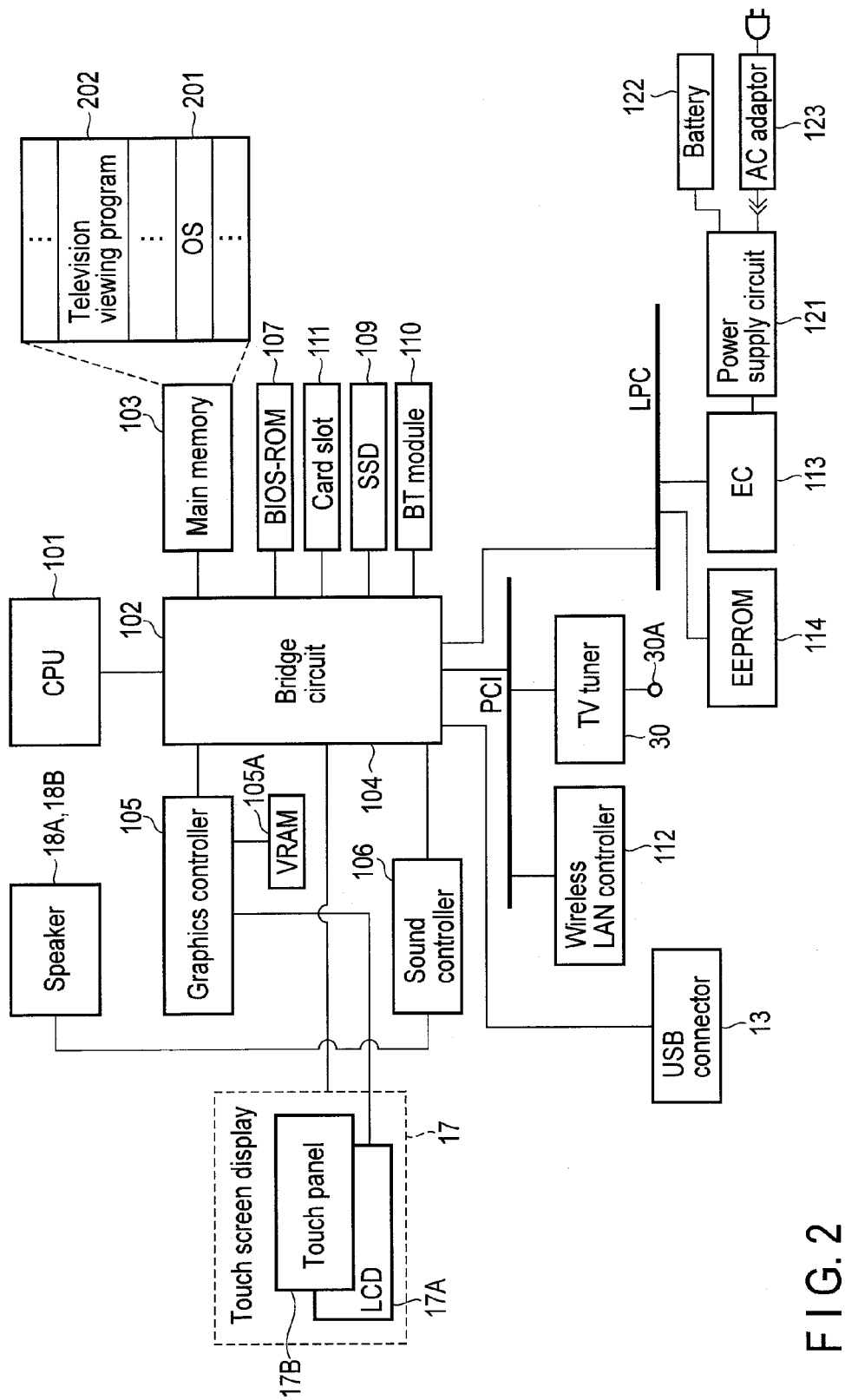
FIG. 2 is an exemplary block diagram illustrating a system configuration of the electronic apparatus according to the embodiment.

FIG. 2 is a block diagram illustrating an example of a system configuration of the computer 10.

The computer 10 comprises a central processing unit (CPU) 101, a bridge circuit 102, a main memory 103, a graphics controller (GPU) 105, a sound controller 106, a BIOS-ROM 107, a solid state drive (SSD) 109, a BT (Bluetooth (Registered Trademark)) module 110, a card slot 111, a wireless LAN controller 112, an embedded controller (EC) 113, an EEPROM 114, a USB connector 13, the touch screen display 17, and a video memory (VRAM) 105A, and the like.

The CPU 101 is a processor which controls operations of the modules in the computer 10. The CPU 101 executes an operating system (OS) 201 and various application programs, which are loaded from the SSD 109 into the main memory 103. The application programs include a television viewing program 202.

The TV tuner receives broadcasting waves which are broadcasted from a broadcasting station which is selected from a plurality of broadcasting stations, and outputs TS (Transport Stream) packets from the received broadcasting waves.

The television viewing program 202 executes live reproduction processing for viewing broadcasting program data which is included in the TS packets that are output from a TV tuner 30, and processing for displaying an electronic program guide based on electronic program guide data which is included in the TS packets that are output from the TV tuner 30.

It is supposed that the OS 201 is, for example, Android (Registered Trademark) OS in the present embodiment. Specifically, suppose that a system using Android (Registered Trademark) OS is used, and that the computer 10 is equipped with Android (Registered Trademark) OS. In the present embodiment, the computer 10 may be equipped with an OS other than Android (Registered Trademark) OS as the OS 201. Specifically, since the system explained in the present embodiment is applicable to a system equipped with another OS, the system explained in the present embodiment is applicable to computer 10 which is equipped with an OS other than Android (Registered Trademark) OS.

The CPU 101 also executes a BIOS (basic input/output system) which is stored in the BIOS-ROM 107. The BIOS is a program configured to control hardware.

The bridge circuit 102 is a bridge device which connects a local bus of the CPU 101 with each device on a PCI (Peripheral Component Interconnect) bus and each device on an LPC (Low Pin Count) bus. The bridge circuit 102 includes a serial ATA (Advanced Technology Attachment) controller configured to control the SSD 109. The bridge circuit 102 also has a function of executing communication with the sound controller 106. The bridge circuit 102 also has a function of executing communication with the GPU 105 through a serial bus of the PCI EXPRESS standard.

The GPU 105 is a display controller which controls an LCD 17A that is used as a display monitor of the computer 10. Image signals (also referred to as display signals) which are generated by the GPU 105 are transmitted to the LCD 17A.

The sound controller 106 is a sound source device, and outputs audio data to be reproduced to a speaker 18A and a speaker 18B. The wireless LAN controller 112 is a wireless communication device which executes wireless communication of, for example, the IEEE 802.11 standard.

The EC 113 is an embedded controller configured to manage electric power. The EC 113 has a function of turning on/off the computer 10 in response to operation by the user. A power supply circuit 121 generates operation electric power which is to be supplied to the components, by using electric power which is supplied from a battery 122 in the computer 10, or electric power which is supplied from an external power source such as an AC adaptor 123. The power supply circuit 121 also charges the battery 122 by using electric power supplied from the external power source.

A touch panel 17B is integrated into the touch screen display 17, as well as the LCD 17A. The touch panel 17B which is superposed on the LCD 17A includes a sensor and an MCU (Micro controller unit) and the like. When touching operation is performed on the touch panel 17B, the touched position is detected by the sensor, and the MCU outputs input information which includes the touched position on the touch panel 17B.

Figure 3:
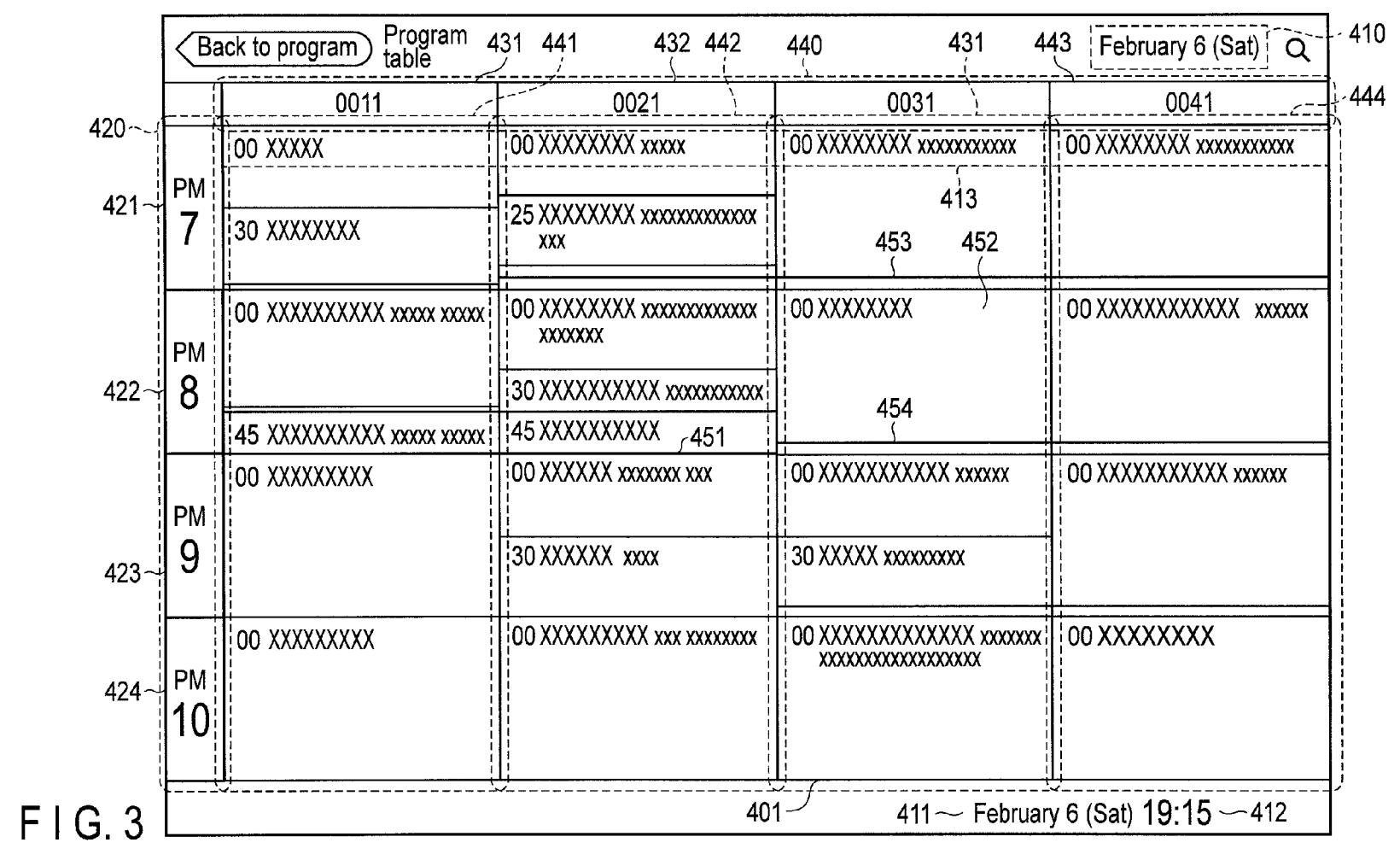

FIG. 3 is a diagram illustrating an example of an electronic program guide which is displayed on the LCD 17A based on the EPG display data generated by the television viewing program 202. The electronic program guide 400 shows information of programs which are broadcasted by four broadcasting stations "0011", "0021", "0031", and "0041" from 7:00 p.m. to 10:59 p.m. on February 6 (Sat).

The electronic program guide 400 includes a program table area 401, a date area 410, a time display bar 420, and a broadcasting station display bar 430.

The program table area 401 is displayed in the center of the electronic program guide 400. The date area 410 is displayed in an upper right end part of the electronic program guide 400. The time display bar 420 is displayed on the left of the program table area 401. The broadcasting station display bar 430 is displayed above the program table area 401. Although a broken line 413 indicates the current time, the broken line 413 is not displayed in the actual screen.

A broadcasting date of programs which are displayed in the program table area 401 is displayed in the date area 410. In the example illustrated in FIG. 3, the date "February 6 (Sat)" is displayed in the date area 410. A sign 411 which is displayed in a lower right part outside the program table area 401 indicates the current date, and a sign 412 indicates the current time.

In the example illustrated in FIG. 3, four time period sections 421 to 424 are arranged in a row direction in the time display bar 420. The time period section 421 corresponds to a time period from 7:00 p.m. to 7:59 p.m. which is 59 minutes after 7:00 p.m., the time period section 422 corresponds to a time period from 8:00 p.m. to 8:59 p.m. which is 59 minutes after 8:00 p.m., the time period section 423 corresponds to a time period from 9:00 p.m. to 9:59 p.m. which is 59 minutes after 9:00 p.m., and the time period section 424 corresponds to a time period from 10:00 p.m. to 10:59 p.m. which is 59 minutes after 10:00 p.m.

Broadcasting station sections 431 to 433 are arranged in a column direction in the broadcasting station display bar 430. In the example illustrated in FIG. 3, the broadcasting station section 431 corresponds to "0011", the broadcasting station section 432 corresponds to "0021", the broadcasting station section 433 corresponds to "0031", and the broadcasting station section 434 corresponds to "0041".

The program table area 401 includes broadcasting station areas 441 to 444, which corresponds to the respective broadcasting station sections. Each broadcasting station area includes program sections which correspond to respective programs (451, 452, 453, 454). Each program section is provided in a region which corresponds to a broadcasting time period in the broadcasting station area. Each program section corresponds to a program which is broadcasted during a first time width which starts with the date "February 6 (Sat)" as a starting point.

FIG. 4 is a block diagram illustrating a structure of the television viewing program 202.

As illustrated in FIG. 4, the television viewing program 202 includes a demultiplexer 301, an audio decoder 302, a video decoder 303, a PSI/SI decoder 304, an EPG display processor 305, a controller 306, and a channel selection request module 307.

The demultiplexer 301 separates PSI/SI (Program Specific Information/Service Information), video data, and audio data from TS (Transport Stream) packets which are output from the TV tuner 30. The demultiplexer 301 outputs the separated audio data to the audio decoder 302, outputs the separated video data to the video decoder 303, and outputs the separated PSI/SI to the PSI/SI decoder 304.

The audio decoder 302 decodes the audio data, and outputs the decoded audio data to the sound controller 106. The video decoder 303 decodes the video data.

The PSI/SI decoder 304 decodes the PSI/SI. The PSI/SI decoder 304 outputs the decoded data to the EPG display processor 305. The PSI (program specific information) is information for identifying information which is included in each TS packet. The SI (service information) is obtained by expanding the PSI to include program information such as a program name and an electronic program guide (EPG). The EPG display processor 305 prepares EPG display data for displaying an electronic program guide including a program table, based on the program information.

The EPG display processor 305 includes a program table data generator 305A, an EPG display controller 305B, and an operation detector 305C.

The program table data generator 305A generates program table data. The program table data comprises program information which is formed of information such as the broadcasting start time, the broadcasting time, the broadcasting station, the program title, the performers, and the summary, and program information items are arranged on a two-dimensional plane based on the dates and the broadcasting stations, with one program serving as a cell. Then, the information items of the programs are databased by the program table data generator 305A such that each program information item can be selected based on the broadcasting date and the broadcasting station. The EPG display controller 305B generates EPG display data for displaying an electronic program guide based on the program table data.

The touch panel 17B outputs information, which includes the touched position on the touch panel 17B, to the television viewing program 202. Based on the input information, the controller 306 detects a user's operation, and one of the video decoder 303 and the EPG display processor 305 requests output of the display data to the graphic controller 105, in accordance with the detection result.

When the EPG display processor 305 outputs EPG display data to the graphics controller 105, input information from the touch panel 17B is supplied to the operation detector 305C.

The operation detector 305C detects an operated position and an operation type, based on the input information which includes the touched position on the touch panel 17B. The operation type includes touching operation, tapping operation, sliding operation, and pinching operation (pinch-in operation and pinch-out operation). The touching operation is an operation of touching the display screen. The tapping operation is an operation of a user touching the screen by a finger and thereafter separating the finger from the screen. The sliding operation is an operation of a user moving the finger which is touching the screen in a target direction while the finger is in contact with the screen.

The operation detector 305C detects that a touching operation is performed on the screen, based on the input information from the touch panel 17B. The EPG display processor 305 detects a user operation (such as tapping operation and sliding operation), based on the input information from the touch panel 17B after a touching operation is detected. In other words, the EPG display processor 305 detects a user operation (such as tapping operation and sliding operation) based on a change in the input information from the touch panel 17B.

A tapping operation or sliding operation is performed on the program table area 410, and thereby the EPG display controller 305B prepares EPG display data for scrolling the display contents in the program table area 401.

In the case where a touching operation is performed on a program section on the program table area 401 when the electronic program guide is displayed, the channel selection request module is notified that the broadcasting station which broadcasts the program that corresponds to the touched program section is selected. The channel selection request module requests the tuner to select the notified broadcasting station. The channel selection request module 307 requests the tuner 30 to select the broadcasting station which broadcasts the program that corresponds to the program section. The tuner 30 selects the broadcasting station in accordance with the request.

(Channel Selection by Using Program Guide)

Figure 5:
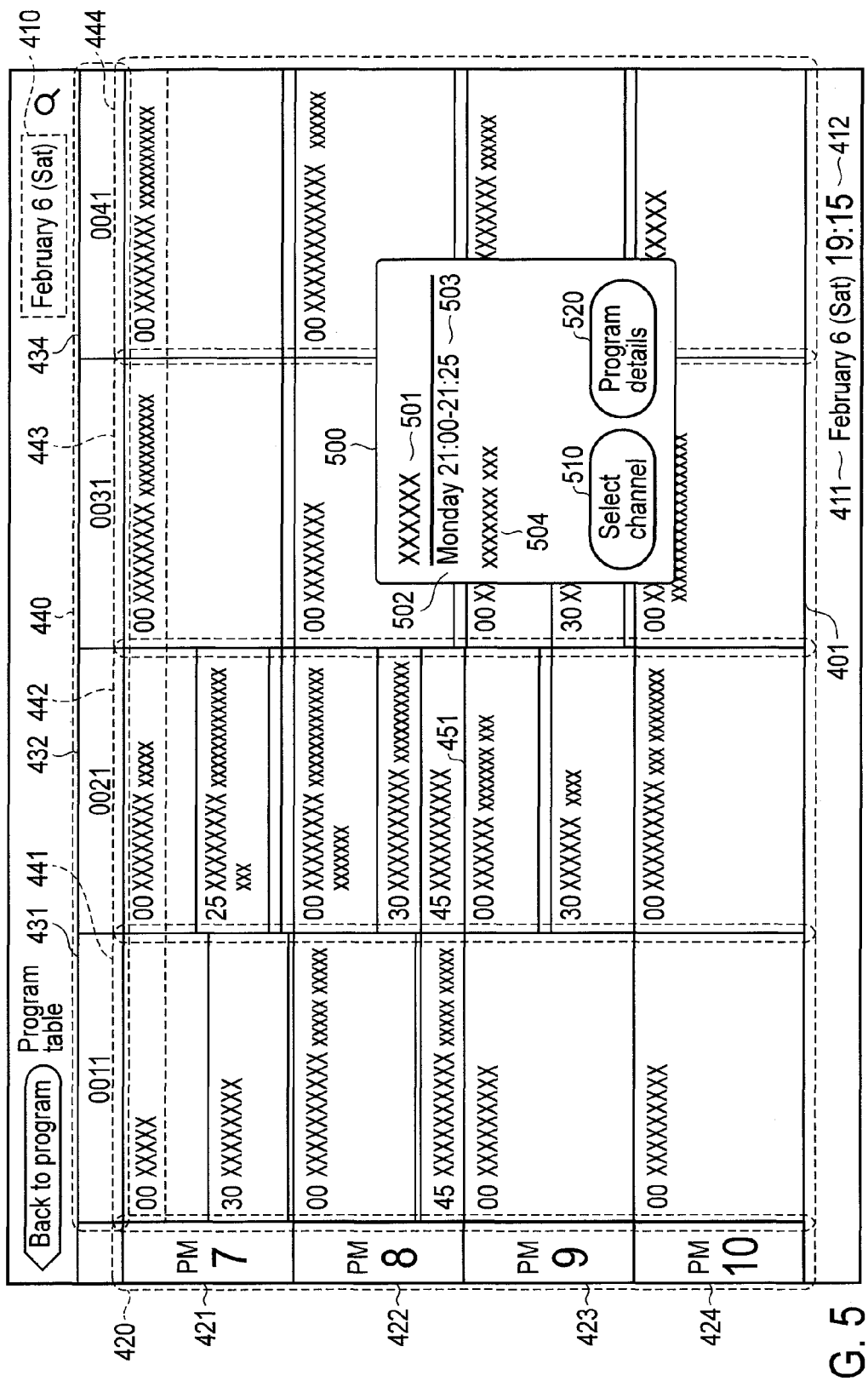
FIG. 5 is an exemplary diagram illustrating an example of a pop-up window and the electronic program guide.

FIG. 5 is a diagram illustrating a pop-up window and an electronic program guide.

When a touching operation is performed on the program table area 401, the EPG display controller 305B displays a pop-up window 500, which corresponds to the program section on which the touching operation is performed, on the electronic program guide 400, as illustrated in FIG. 5. FIG. 5 illustrates the pop-up window 500 which is displayed when a touching operation is performed on the program section 451 of FIG. 4.

As illustrated in FIG. 5, a program name 501, a broadcasting day of the week 502, a broadcasting time period 503, program explanation 504, a channel selection button 510, and a program detail button 520 are displayed in the pop-up window 500. The channel selection button 510 is provided to select a broadcasting station which broadcasts a program that corresponds to the program section on which a touching operation is performed. The program detail button 520 is provided to display detailed explanation of the program on the display screen.

When a touching operation is performed on the channel selection button 510, the channel selection request module requests the tuner 30 to select a broadcasting station which broadcasts a program that corresponds to the program section on which the touching operation is performed.

Figure 6:
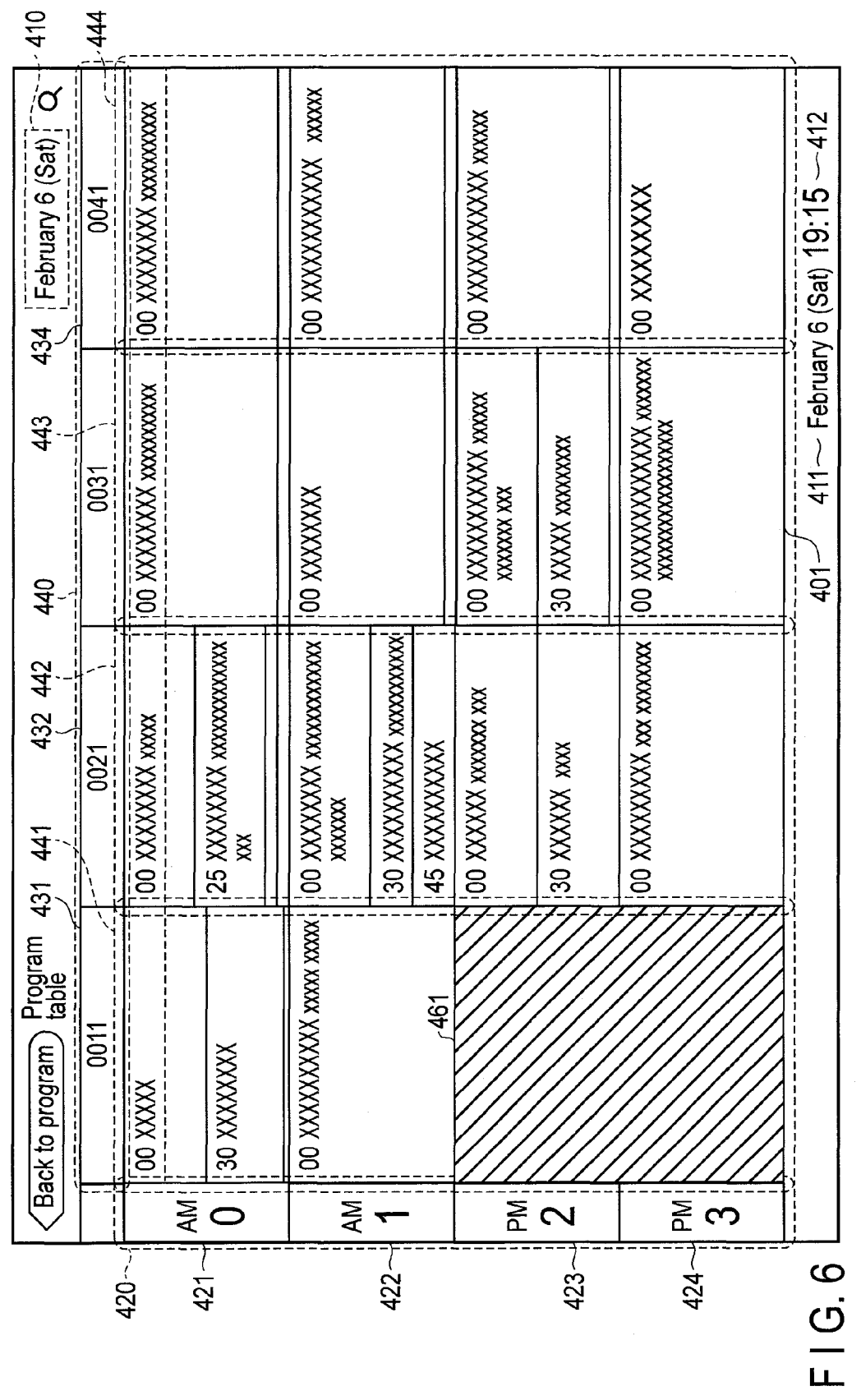
Figure 7:
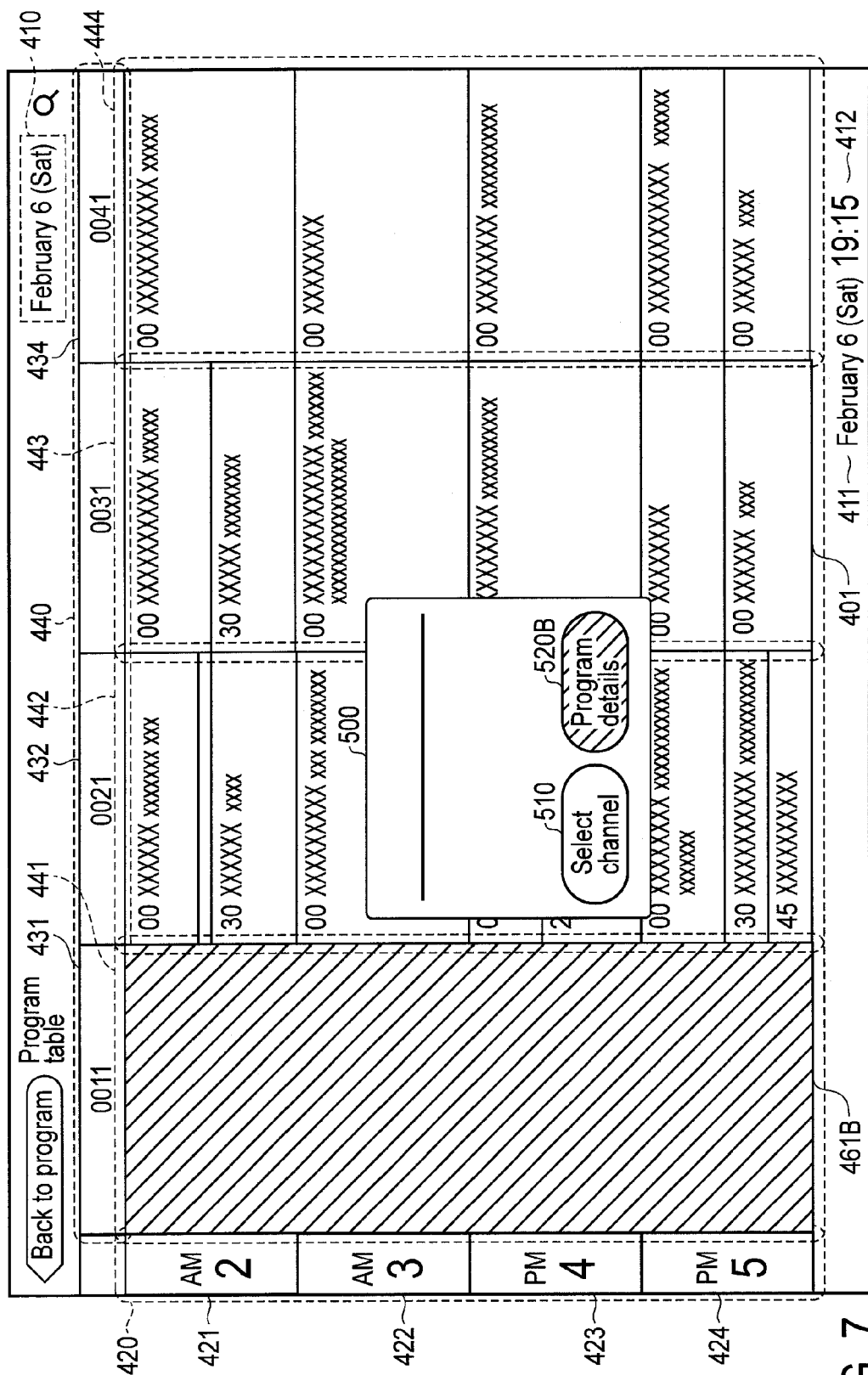
FIG. 7 is an exemplary diagram illustrating an example of the electronic program guide.

FIG. 6 and FIG. 7 are diagrams illustrating the electronic program guide.

As illustrated in FIG. 6 and FIG. 7, an unobtained/broadcasting stopping section 461A or 461B is displayed for a time period for which no program information is obtained in the broadcasting station area, or a time period in which broadcasting is stopped. As illustrated in FIG. 6, when part of the broadcasting station area is unobtained/broadcasting stopping section 461A, no pop-up window is displayed even when a touching operation is performed on the unobtained-broadcasting stopping section 461A. As illustrated in FIG. 7, however, in the case where the whole broadcasting station area 441 is unobtained/broadcasting stopping section 461B, a pop-up window 500A is displayed, when a touching operation is performed on the unobtained/broadcasting stopping section 461B. Since no tapping operation is performed for any program table which corresponds to a specific program, no broadcasting day of the week, broadcasting time period, or program explanation are displayed in the pop-up window 500A. In addition, a detail display button 520A is grayed out, to show that no operation can be performed by the detail display button 520A.

Figure 8:
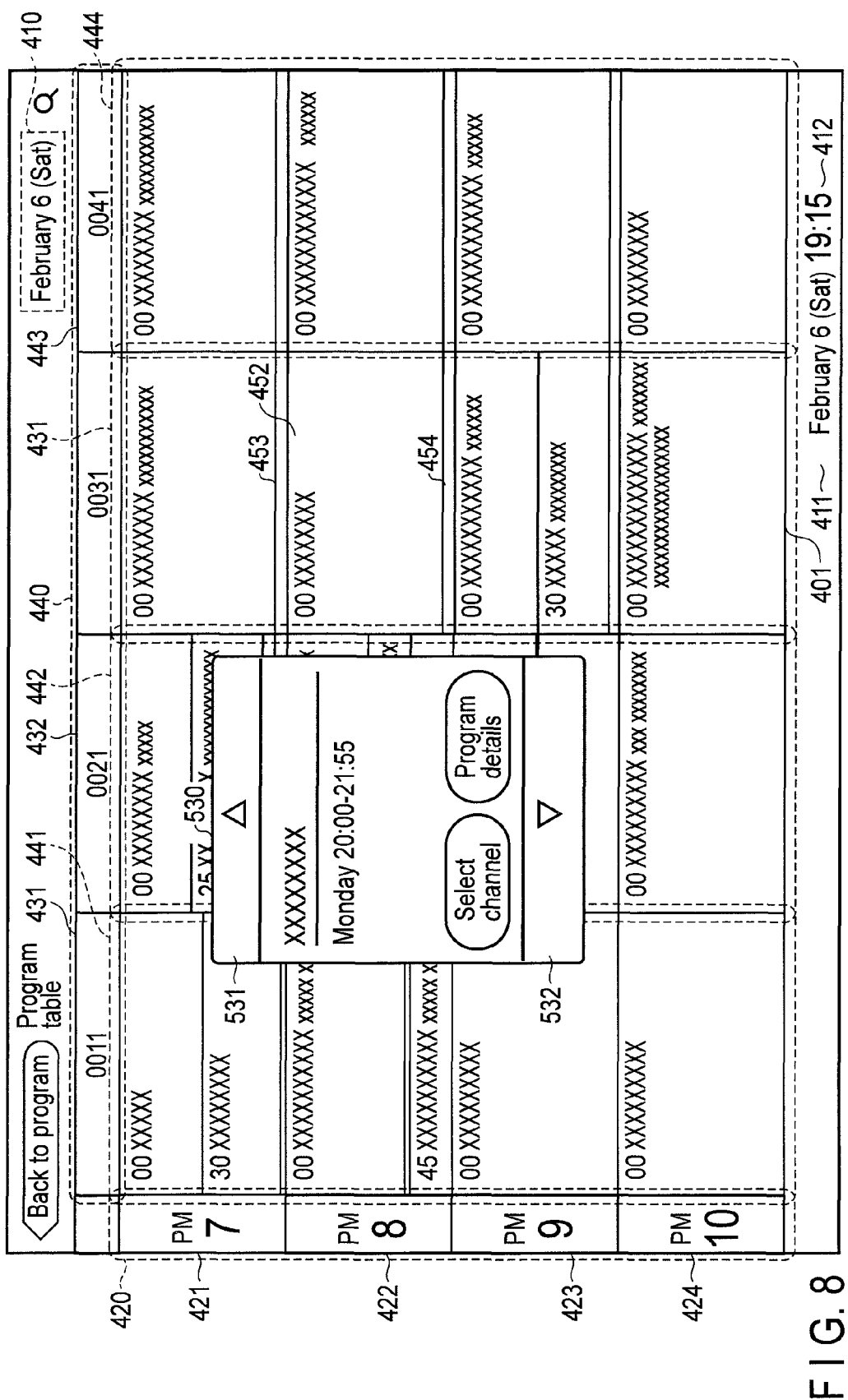
FIG. 8 is an exemplary diagram illustrating an example of the pop-up window and the electronic program guide.

FIG. 8 is a diagram illustrating an example of a pop-up window and the electronic program guide. Program sections 453 and 454, which are located above and under the program section 452 in FIG. 4, have a small height in the row direction, and it is difficult to perform a touching operation for the program sections. When a touching operation is performed on the program section such that a pop-up window which corresponds to the program section can be easily displayed, a pop-up window 530 illustrated in FIG. 8 is displayed on the electronic program guide 400. As illustrated in FIG. 8, the pop-up window includes selection buttons 531 and 532 configured for displaying a pop-up window in accordance with the program section.

The selection button 531 is a selecting operation area for displaying a pop-up window which corresponds to the program section 453. The selection button 532 is a selecting operation area for displaying a pop-up window which corresponds to the program section 454.

Figure 9:
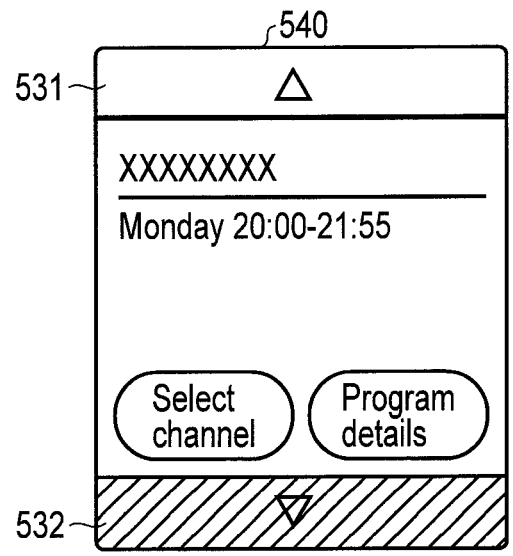
FIG. 9 is an exemplary diagram illustrating an example of the pop-up window.
Figure 10:
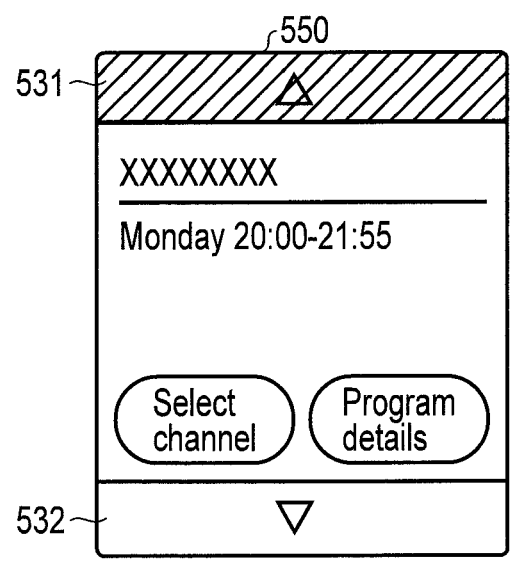
FIG. 10 is an exemplary diagram illustrating an example of the pop-up window.

FIG. 9 and FIG. 10 are diagrams illustrating examples of a pop-up window.

A pop-up window 540 illustrated in FIG. 9 is displayed, when the program section which is located above the program section has a small height and the height of the program section which is located under the program section is not small. The selection button 532 is grayed out, to show that no operation using the selection button 532 can be performed. A pop-up window 550 illustrated in FIG. 10 is displayed, when the height of the program section which is located above the program section is not small and the program section which is located under the program section has a small height. The selection button 531 is grayed out, to show that no operation using the selection button 532 can be performed.

Figure 11:
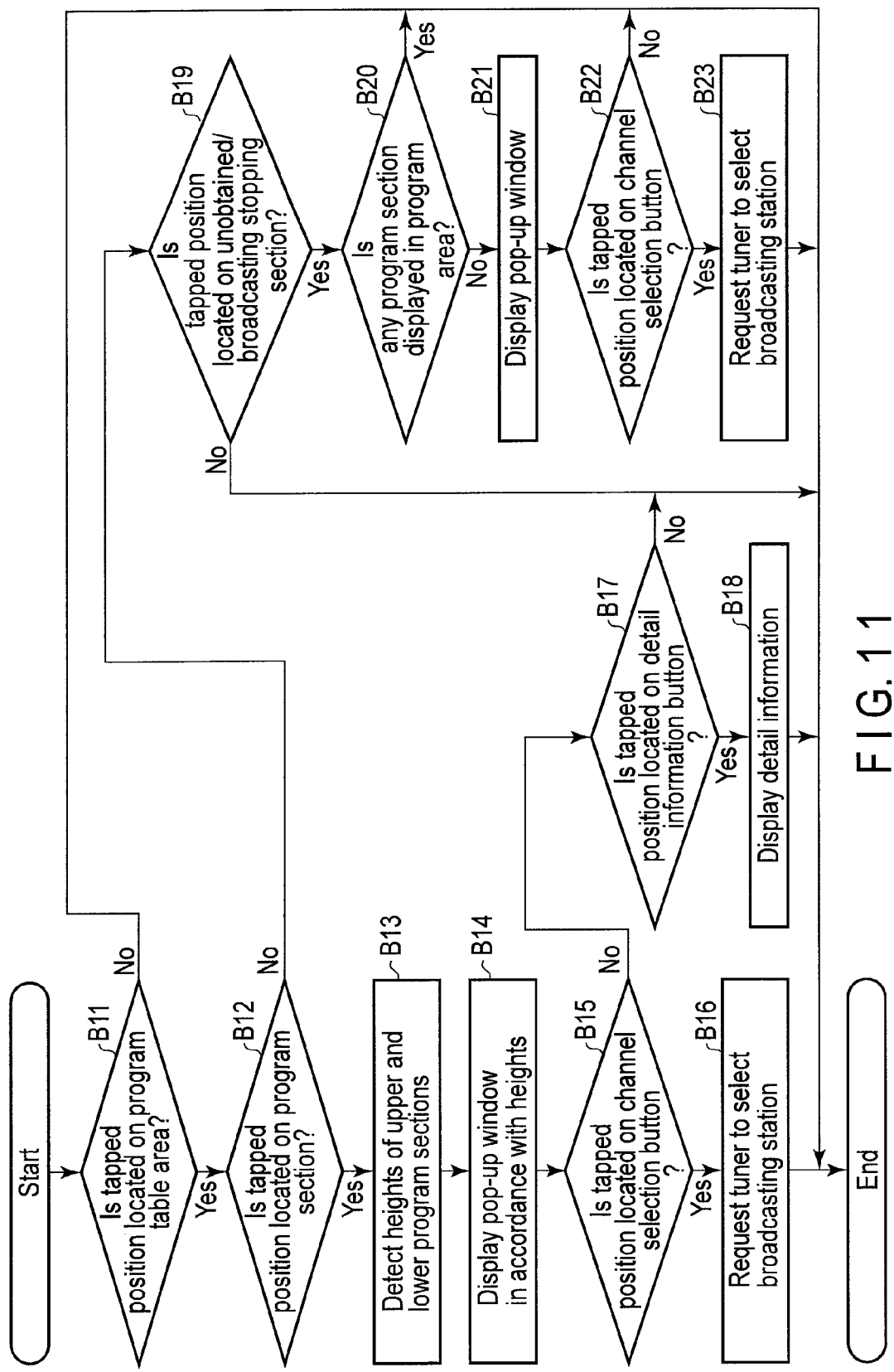
FIG. 11 is an exemplary flowchart illustrating an example of a process performed by the television viewing program.

FIG. 11 is a flowchart illustrating a process which is performed by the television viewing program.

When a tapping operation is performed, the EPG display controller 305B determines whether the operation position is located in the program table area (Step B11). When it is determined that the operation position is located on the program table area (Yes of Step B11), the EPG display controller 305B determines whether a position which corresponds to the operation position is a program section or not (Step B12). When it is determined that the position is a program section (Yes of Step B12), the EPG display controller 305B detects the row-direction heights of program sections which are located above and under the detected program section (Step B13).

The EPG display controller 305 displays a pop-up window in accordance with the detected heights (Step B14). When the row-direction heights of the upper and lower program sections are lower than a preset height, the EPG display controller 305B displays the pop-up window 530. When the row-direction height of the upper program section is lower than the preset height and the row-direction height of the lower program section is not lower than the preset height, the EPG display controller 305B displays the pop-up window 530. When the row-direction height of the upper program section is not lower than the preset height and the row-direction height of the lower program section is lower than the preset height, the EPG display controller 305B displays the pop-up window 540.

When a tapping operation is performed after the pop-up window is displayed, the EPG display controller 305B determines whether the tapped position is located on the channel selection button 510 (Step B15). When it is determined that the tapped position is located on the channel selection button 510 (Yes of Step B15), the EPG display controller 305B notifies the channel selection request module that the broadcasting station which broadcasts the program that corresponds to the program section is selected. The channel selection request module requests the tuner to select the notified broadcasting station (Step B16).

When it is determined that the tapped position is not located on the channel selection button 510 (No of Step B15), the EPG display controller 305B determines whether the tapped position is located on the detail information button 520 (Step B17). When it is determined that the tapped position is located on the detail information button 520 (Yes of Step B17), a detailed explanation of the program is displayed on the display screen (Step B18).

When it is determined at Step B12 that the position is not located on the program section (No of Step B12), the EPG display controller 305B determines whether the operation position is located on an unobtained/broadcasting stopping section (Step B19).

When it is determined that the operation position is located on the unobtained/broadcasting stopping section (Yes of Step B19), the EPG display controller 305B determines whether any program section is displayed in the broadcasting station area which includes the unobtained/broadcasting stopping section (Step B20). When it is determined that a program section is displayed (Yes of Step B20), the EPG display controller 305B displays no pop-up window. When it is determined that a program section is displayed (No of Step B20), the EPG display controller 305B displays a pop-up window as illustrated in FIG. 7 (Step B21).

When a tapping operation is performed after the pop-up window is displayed, the EPG display controller 305B determines whether the tapped position is located on the channel selection button 510 (Step B22). When it is determined that the tapped position is located on the channel selection button 510 (Yes of Step B22), the EPG display controller 305B notifies the channel selection request module that the broadcasting station which broadcasts the program which corresponds to the unobtained/broadcasting stopping section is selected. The channel selection request module requests the tuner to select the notified broadcasting station (Step B23).

Although the program information is obtained from the broadcasting waves, the program information may be obtained from a server which is connected to the Internet. In addition, the electronic apparatus may not include the liquid crystal display apparatus, or the touch panel.

According to the present embodiment, when an operation is performed for a program section which corresponds to a program which is not broadcasted in the program table area, the TV tuner 30 is requested to select the broadcasting station which broadcasts the program that corresponds to the operated program section, and thus it is possible to perform channel selection in a state where an electronic program guide is displayed.

The processing represented by each flowchart explained in the present embodiment can be achieved by a program, and the same effect as that of the present embodiment can be easily achieved, by installing and executing such software in an ordinary computer by using a storage medium which is readable by a computer and stores the software.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a tuner configured to receive a broadcasting signal from one of a plurality of broadcasting stations;
    a receiver configured to receive program information corresponding to programs that are broadcast by the plurality of broadcasting stations;
    a display controller configured to display, on a display screen, an electronic program guide table based on the program information, the electronic program guide table comprising program sections corresponding to programs broadcast during a first time period of a first date;
    a selection module configured to display, if a first program section corresponding to a first program is operated and the first program has not been broadcast and will be broadcast by a first broadcasting station, a first window comprising a first operation area configured to allow a user to determine whether to select the first broadcasting station; and a request module configured to request the tuner to select the first broadcasting station if the first operation area is operated, wherein the program guide table comprises broadcasting station areas corresponding to at least part of the plurality of broadcasting stations, each program section is arranged in a region in accordance with a broadcasting time and a broadcasting station of a program, the display controller is configured to display an unobtained or broadcasting stopping section in a region corresponding to a time period for which program information of a program broadcast by a second broadcasting station is not obtained, or in a region which corresponds to a time period during which the second broadcasting station stops broadcasting in a second broadcasting station area that corresponds to the second broadcasting station when the first time period comprises the time period for which the program information of the program broadcast by the second broadcasting station is not obtained, or the time period in which the second broadcasting station stops broadcasting, the selection module is configured to not display a second window comprising a second operation area configured to allow a user to determine whether to select the second broadcasting station if part of the second broadcasting station area is an unobtained or broadcasting stopping section and it is detected that the unobtained or broadcasting stopping section is operated, the selection module is configured to display the second window if the whole second broadcasting station area is an unobtained or broadcasting stopping section and it is detected that the second broadcasting station area is operated; and the selection module is configured to determine that a width of a second program section, which is adjacent to the first program section in the broadcasting station area, in a direction in which the first program section and the second program section are arranged is smaller than a preset width, and in response to determining that the width of the second program section is smaller than the present width, the selection module is configured to display the first window comprising the first operation area, the second operation area, and a third operation area to cause the user to select whether to change the first window to the second window, the second window comprising the first operation area and a fourth operation area to cause the user to select whether to display detailed information of a second program that corresponds to the second program section.

2. The apparatus of claim 1, wherein
each program information comprises detailed information, and
the first window further comprises the second operation area to cause the user to select whether to display detailed information of the first program.

3. The apparatus of claim 1, further comprising:
a display panel comprising the display screen; and
an operation position detection module configured to detect an operation position on the display screen.

4. A channel selection method of displaying information about a broadcasting signal broadcast from a broadcasting station, the broadcasting station selected from one of a set of broadcasting stations, the method comprising:

obtaining a plurality of program information corresponding to programs that are broadcast by the set of broadcasting stations;

displaying on a display screen, an electronic program guide table based on the program information, the electronic program guide table comprising program sections corresponding to programs broadcast during a first time period of a first date, wherein the program guide table comprises broadcasting station areas corresponding to at least part of the plurality of broadcasting stations, and each program section is arranged in a region in accordance with a broadcasting time and a broadcasting station of a program;

displaying an unobtained or broadcasting stopping section in a region corresponding to a time period for which program information of a program broadcast by a first broadcasting station is not obtained, or in a region which corresponds to a time period during which the first broadcasting station stops broadcasting in a first broadcasting station area that corresponds to the first broadcasting station when the first time period comprises the time period for which the program information of the program broadcast by the first broadcasting station is not obtained, or the time period in which the first broadcasting station stops broadcasting;

not displaying a first window comprising a first operation area configured to allow a user to determine whether to select the first broadcasting station if part of the first broadcasting station area is an unobtained or broadcasting stopping section and it is detected that the unobtained or broadcasting stopping section is operated;

displaying the first window if the whole first broadcasting station area is an unobtained or broadcasting stopping section and it is detected that the first broadcasting station area is operated;

requesting a tuner to select the first broadcasting station if the first operation area is operated;

determining a width of a second program section, which is adjacent to the first program section in the broadcasting station area, in a direction in which the first program section and the second program section are arranged is smaller than a preset width; and in response to determining that the width of the second program section is smaller than the preset width, displaying the first window comprising the first operation area, a second operation area, and a third operation area to cause the user to select whether to change the first window to a second window, wherein the second window comprises the first operation area and a fourth operation area to cause the user to select whether to display detailed information of a second program that corresponds to the second program section.

5. The method of claim 4, wherein
each program information comprises detailed information, and
the first window further comprises the second operation area to cause the user to select whether to display detailed information of the first program.

6. A computer-readable non-transitory storage medium having stored thereon a computer program which is executable by a computer for displaying information about a broadcasting signal broadcast from one of a set of broadcasting stations, the computer program controlling the computer to execute functions of:

obtaining a plurality of program information corresponding to programs that are broadcast by the set of broadcasting stations;

displaying on a display screen, an electronic program guide table based on the program information, the electronic program guide table comprising program sections corresponding to programs broadcast during a first time period of a first date, wherein the program guide table comprises broadcasting station areas corresponding to at least part of the plurality of broadcasting stations, and each program section is arranged in a region in accordance with a broadcasting time and a broadcasting station of a program; and displaying an unobtained or broadcasting stopping section in a region corresponding to a time period for which program information of a program broadcast by a first broadcasting station is not obtained, or in a region which corresponds to a time period during which the first broadcasting station stops broadcasting in a first broadcasting station area that corresponds to the first broadcasting station when the first time period comprises the time period for which the program information of the program broadcast by the first broadcasting station is not obtained, or the time period in which the first broadcasting station stops broadcasting, wherein the program does not display a first window comprising a first operation area configured to allow a user to determine whether to select the first broadcasting station if part of the first broadcasting station area is an unobtained or broadcasting stopping section and it is detected that the unobtained or broadcasting stopping section is operated, wherein the program displays the first window if the whole first broadcasting station area is an unobtained or broadcasting stopping section and it is detected that the first broadcasting station area is operated, and wherein the computer program controls the computer to further execute a function of requesting a tuner to select the first broadcasting station if the first operation area is operated, wherein the computer program further controls the computer to execute a function of:

determining that a width of a second program section, which is adjacent to the first program section in the broadcasting station area, in a direction in which the first program section and the second program section are arranged is smaller than a preset width; and in response to determining that the width of the second program section is smaller than the preset width, displaying the first window comprising the first operation area, a second operation area, and a third operation area to cause the user to select whether to change the first window to a second window, wherein the second window comprises the first operation area and a fourth operation area to cause the user to select whether to display detailed information of a second program that corresponds to the second program section.

7. The computer-readable non-transitory storage medium of claim 6, wherein each program information comprises detailed information, and the first window further comprises the second operation area to cause the user to select whether to display detailed information of the first program.

\* \* \* \* \*